United States Patent [19]

Kaneko et al.

[11] Patent Number: 4,798,733

[45] Date of Patent: Jan. 17, 1989

[54] YEAST-FERMENTED FOOD MODIFIER

[75] Inventors: Tomiatsu Kaneko, Ichikawa; Kazuaki Yokoyama, Inba; Hisashi Tsuruoka, Narashino, all of Japan

[73] Assignee: Miyoshi Oil & Fat Co., Ltd., Tokyo, Japan

[21] Appl. No.: 33,545

[22] Filed: Apr. 1, 1987

[30] Foreign Application Priority Data

Jul. 31, 1986 [JP] Japan .................................. 61-180940

[51] Int. Cl.$^4$ ............................................... A21P 2/00
[52] U.S. Cl. ..................... 426/549; 426/19; 426/23; 426/653
[58] Field of Search ............... 426/653, 602, 549, 321, 426/19, 23

[56] References Cited

U.S. PATENT DOCUMENTS

| 3,729,325 | 4/1973 | Howard | 426/602 |
| 3,782,971 | 1/1974 | Roon | 426/602 |
| 3,870,799 | 3/1975 | Jenney | 426/653 |
| 4,501,757 | 2/1985 | Smith et al. | 426/653 |
| 4,684,526 | 8/1987 | Knightly | 426/321 |

OTHER PUBLICATIONS

"The Use of Isolated Soybean Proteins in Bread," Cereal Chem. 44: 193–203 (1967).
"Effects of Various Soy Protein Products in Bread Characteristics," *The Baker's Digest* pp. 44–50, 61 (Dec. 1968).
"Soy Concentrate and Soy Isolate in Bread Baking," *The Baker's Digest,* pp. 18–24 (Feb. 1978).

*Primary Examiner*—Steven Weinstein
*Assistant Examiner*—Mary S. Mims
*Attorney, Agent, or Firm*—Willian Brinks Olds Hofer Gilson & Lione Ltd.

[57] ABSTRACT

A composition for use in yeast-fermented foods to modify the food and improve its softness during storage is disclosed. The composition comprises (by weight) 1 part of protein, 0.5 to 4 parts of edible fat and oil, 3.5 to 13 parts of water, 0.5 to 2 parts of at least one material selected from the group consisting of mashed potato powder, sweet potato powder and starch; and 0.3 to 4.5% of a phosphate and/or citrate based on the total weight of said protein, edible fat and oil, water and at least one material selected from the group consisting of mashed potato powder, sweet potato powder and starch.

8 Claims, No Drawings

YEAST-FERMENTED FOOD MODIFIER

BACKGROUND OF THE INVENTION

The present invention relates to a modifier for yeast-fermented food. The invention particularly relates to a modifier which is capable of preventing yeast-fermented food from aging, thus keeping softness over a long period of time. The modifier is kneaded into the dough of yeast-fermented foods such as bread, yeast doughnuts, and pizza crust.

Although yeast-fermented foods such as bread, yeast doughnuts, and pizza crust are preferably soft when eaten, usually these foods lose their softness with time after being manufactured. Particularly, doughnuts age rapidly after being fried, and hence it is difficult to maintain their softness over long time periods.

In order to keep the softness of those types of yeast-fermented foods over long time periods after manufacture, various modification methods have been studied, including the addition of monoglyceride to the dough. However, while the method of adding monoglyceride has an effect on bread in some degree, little effect is expected on doughnuts and pizza crusts, and the method has a disadvantage in that when monoglyceride is used excessively, the taste of the food is impaired.

SUMMARY OF THE INVENTION

As the result of detailed studies made in view of the above problems, the inventors have found that a composition compounded of specified amounts of protein, edible fat, oil and water, at least one material selected from the group consisting of mashed potato powder, sweet potato powder and starch, and a phosphate and/or citrate, is effective for producing foods with excellent softness just after manufacture and for keeping the softness over long time periods.

DETAILED DESCRIPTION OF THE INVENTION AND PREFERRED EMBODIMENTS

The yeast-fermented food modifier of the present invention comprises (by weight) 1 part of protein, 0.5 to 4 parts of edible fat and oil, 3.5 to 13 parts of water, 0.5 to 2 parts of at least one material selected from the group consisting of mashed potato powder, sweet potato powder and starch; and 0.3 to 4.5 wt-% of a phosphate and/or citrate, based on the total weight of said protein, edible fat and oil, water and at least one material selected from the group consisting of mashed potato powder, sweet potato powder and starch.

Examples of the protein useful in the present invention are rennet casein, acid casein, whole milk powder, skim milk powder, and soybean protein. These may be used by themselves or in mixtures of two or more. Examples of the edible fat and oil useful in the present invention are: animal fats and oils such as beef tallow, lard, and milk fat; solid vegetable fats and oils such as coconut oil, palm oil, and palm kernel oil; liquid vegetable fats and oils such as soybean oil, rapeseed oil, cottonseed oil, safflower oil, peanut oil and rice oil; hydrogenated oils of said animal fats and oils and vegetable fats and oils; hydrogenated oils such as fish hydrogenated oils; fractional oils, such as fractional solid fats and oils obtained by fractionation (separation between solid and liquid phases using the difference in melting point) of solid animal and vegetable fats and oils and hydrogenated oils, and fractional liquid fats and oils; and transesterified oils obtained by transesterification of oil mixtures of one or more animal and vegetable fats and oils and hydrogenated oils. Emulsifying oils such as butter and margarine are also included in the group of edible fat and oil which may be used in the present invention.

Starches useful in the present invention include corn starch, potato starch, sweet potato starch, rice starch, tapioca starch, etc., and also mashed potato and sweet potato powder containing such starch can be used (mashed potato powder, sweet potato powder and starch are hereinafter referred to as starches in general).

The above-mentioned sweet potato powder is a powder of sweet potato origin. The edible fats and oils, as well as the starches, can be used individually or in mixtures of one or more type.

In compounding the present protein, edible fat and oil and starches with water, the proportions of the edible fat and oil, water, and starches to the protein are: 0.5 to 4 parts, preferably 1 to 3.5 parts, of the edible fat and oil, based on 1 part by weight of the protein; 3.5 to 13 parts, preferably 5 to 12 parts, of water; and 0.5 to 2 parts, preferably 0.8 to 1.5 parts, of the starches.

When the amount of the edible fat and oil is less than 0.5 part by weight per unit weight of the protein, the present modifier shows poor dispersibility when kneaded into the dough of doughnuts, etc., as well as little effect of modification. When the amount exceeds 4 parts by weight, the fat and oil are not sufficiently dispersed and hence no uniform emulsion is obtained. When the amount of water is less than 3.5 parts by weight, the product is hard and difficult to handle, while, when it exceeds 12 parts by weight, the product becomes like liquid and easy to separate. When the amount of the starches is less than 0.5 part by weight, if the amount of the protein is small, the product is too soft so that it becomes easy to separate, while, if the amount of the protein is large, the product becomes hard so that it cannot be uniformly mixed and dispersed when kneaded into the dough. When the amount of the starches exceeds 2 parts by weight, the product becomes dry so that it cannot uniformly be dispersed when kneaded into the dough.

According to the present invention, 0.3 to 4.5 wt-%, preferably 0.8 to 3.5 wt-%, of a phosphate and/or citrate is compounded with the total weight of the protein, edible fat and oil, water and starches. Examples of the phosphate are disodium phosphate, trisodium phosphate, tetrasodium phosphate, sodium hexametaphosphate, sodium tripolyphosphate, monosodium diphosphate, disodium diphosphate, trisodium diphosphate, tetrasodium diphosphate, sodium pyrophosphate, dipotassium phosphate, tripotassium phosphate, tetrapotassium phosphate, and aluminum sodium phosphate. Examples of the citrate are sodium citrate and potassium citrate.

These phosphates and citrates may be used individually or in mixtures of two or more.

When the amount of the phosphate and/or citrate is less than 0.3 wt-%, the protein and fat and oil are not sufficiently mixed and emulsified and hence no uniform product is obtained, while when the amount exceeds 4.5 wt-%, a bitter taste results so that the final product of yeast-fermented food deteriorates in both taste and flavor.

In addition to the above components, salts, gum material, emulsifiers, organic acids, and flavor may be compounded according to necessity. Gum material includes locast bean gum, guar gum, carrageenan gum, arabic gum, xanthane gum, alginic acid, and sodium alginate. Emulsifiers are edible emulsifiers such as glycerol fatty acid monoesters, glycerol fatty acid diesters, lecithin, propylene glycol fatty acid esters, polyglycerol fatty acid esters, and sorbitan fatty acid ester. Organic acids include: citric acid, lactic acid, acetic acid, ascorbic acid, tartaric acid, malic acid, edible vinegars such as grain vinegar, rice vinegar, apple vinegar, grape vinegar, lemon vinegar, Sushi vinegar, and powdered Sushi vinegar; and concentrated juices such as concentrated lemon juice, concentrated apple juice, and concentrated pineapple juice, among which one or more kinds can be used.

The gum material, emulsifier, and organic acid are added preferably in proportions of 3 wt-% or less, 3 wt-% or less, and 2 wt-% or less, respectively, on the basis of the total weight of the protein, edible fat and oil, water and starches.

In addition to the above (salt, gum material, emulsifier, organic acid and flavor), butter, cheese, and fermented milk can be used in appropriate amounts according to necessity.

For example, the present yeast-fermented food modifier is prepared as follows: at first, starch is added to water to form a paste by heating and stirring. Next, the paste is admixed with a phosphate and/or citrate and with salt according to necessity, and then protein is added with heating and stirring. Subsequently, edible fat and oil are added and the resulting mixture is heated with stirring at 60° to 100° C., after which additives such as organic acids and flavors are added to a product as needed.

Alternatively, water is admixed with a phosphate and/or citrate and with salt according to necessity, and then protein and starches are added to form a paste by heating and stirring. Subsequently, edible fat and oil are added, and the resulting mixture is heated with stirring at more than 50° C., preferably 70° to 100° C., after which additives such as organic acids and flavors are added to prepare a product.

When the organic acid is added, it is preferable to add it so that the pH value of the system is in the order of 5.0 to 6.5.

With the dough for producing yeast-fermented foods such as bread, yeast doughnuts, and pizza crusts, the present modifier is used in the amount of 5 to 20 wt-% on the basis of the amount of the wheat flour, thereby preventing the yeast-fermented food from aging and maintaining its softness over a long period of time.

The present invention is explained in detail by the following examples.

EXAMPLES 1 to 4 and COMPARATIVE EXAMPLES 1 to 3

On the basis of the compounding proportions shown in Table 1, the starches were first added to ¾ of the total weight of water and the resulting mixture was heated at 80° C. with stirring to form a paste. Subsequently, the phosphate, citrate and salt, etc., were added, and the resulting mixture was heated at 85° C. with stirring.

TABLE 1

| Ingredient (in grams) | Example Number | | | | | | | | Comparative Example Number | | | | | |
|---|---|---|---|---|---|---|---|---|---|---|---|---|---|---|
| | 1 | 2 | 3 | 4 | 5 | 6 | 7 | 8 | 1 | 2 | 3 | 5 | 6 | 7 |
| Rennet Casein | 128 | — | — | 50 | 38 | — | 30 | 36 | 95 | 68 | — | — | — | — |
| Acid Casein | — | 68 | — | — | 20 | 30 | 30 | 10 | — | — | 138 | 55 | — | — |
| Soy Bean Protein | — | — | 118 | 47 | — | 35 | 30 | 10 | — | — | — | — | 88 | 74 |
| Hardened Cotton Seed Oil (M.P. 34° C.) | 130 | — | — | — | — | — | — | 194 | 28 | — | — | — | — | — |
| Palm Oil | — | 68 | — | 339 | — | — | — | — | — | 306 | — | — | — | — |
| Hardened Soy Bean Oil (M.P. 38° C.) | — | — | 118 | — | — | — | 318 | — | — | — | 277 | 109 | 177 | — |
| Hardened Fish Oil (M.P. 36° C.) | — | — | — | — | 202 | 65 | — | — | — | — | — | — | — | 148 |
| Potato Starch | 52 | — | — | — | 46 | 37 | — | 20 | 114 | 81 | — | — | — | — |
| Mashed Potato Powder | 50 | — | 176 | — | — | 30 | 50 | 23 | — | — | 166 | 66 | — | — |
| Potato Flour | — | — | — | 78 | — | — | 50 | 20 | — | — | — | — | 27 | 185 |
| Rice Starch | — | 54 | — | — | — | 30 | 36 | 20 | — | — | — | — | — | — |
| Water | 641 | 811 | 588 | 485 | 694 | 774 | 454 | 668 | 761 | 544 | 416 | 769 | 708 | 592 |
| Salt | 10 | 18 | 12 | 16 | — | 20 | 2 | 15 | — | — | — | — | — | — |
| Disodium Phosphate | 25 | — | — | — | 15 | 8 | 5 | 5 | 15 | 15 | 15 | 15 | 15 | 15 |
| Trisodium Phosphate | — | 15 | — | — | 5 | 2 | — | 5 | 5 | 5 | 5 | 5 | 5 | 5 |
| Sodium Hexa Metaphosphate | — | — | 30 | — | 5 | — | — | 5 | 5 | 5 | 5 | 5 | 5 | 5 |
| Sodium Citrate | — | — | — | 38 | — | — | 4 | 10 | — | — | — | — | — | — |
| Lactic Acid | 10 | 12 | — | 20 | 10 | — | — | 10 | 10 | 10 | 10 | 10 | 10 | 10 |
| Citric Acid | 3 | — | 5 | — | — | 3 | — | 2 | — | — | — | — | — | — |
| Guar Gum | 5 | 10 | 15 | — | — | 5 | — | 3 | — | — | — | — | — | — |
| Locust Gum | — | 5 | — | 25 | — | — | — | — | — | — | — | — | — | — |
| Carrageenan | 5 | — | — | — | 18 | — | 3 | — | 18 | 18 | 18 | 18 | 18 | 18 |
| Xanthan Gum | — | — | — | — | — | — | — | 5 | — | — | — | — | — | — |
| Alginic Acid | — | — | 2 | 4 | — | — | 8 | 3 | — | — | — | — | — | — |

Then, the mixture was admixed with the protein and gum material and heated at 95° C. with stirring, after which the edible fat and oil and 2 g of flavor were added and the remaining water was added. The resulting solution was heated at 80° C. with stirring, and then the organic acid was added. An emulsion composition was thus obtained.

Ten parts by weight of the above composition were mixed with 100 parts by weight of doughnut mix (#605, available from Tokyo Seifun Co.), 5 parts by weight of egg, 4 parts by weight of yeast and 40 parts by weight of water, and doughnuts were produced by the process shown in Table 2. Properties of the doughnuts thus obtained are shown in Table 3.

COMPARATIVE EXAMPLE 4

A doughnut was produced in the same manner as Examples 1 to 4 using 100 parts by weight of doughnut mix (#605, available from Tokyo Seifun Co.), 5 parts by weight of egg, 4 parts by weight of yeast and 40 parts by weight of water. Properties of the doughnut thus obtained are also shown in Table 3.

EXAMPLES 5 to 8 and COMPARATIVE EXAMPLES 5 to 7

Based on the compounding proportions shown in Table 1, an emulsion composition was obtained in the same manner as Examples 1 to 4.

Thirteen parts by weight of the composition were mixed with 70 parts by weight of hard flour (high protein wheat flour for bread, with a protein content of about 14.5%), 30 parts by weight of soft flour (wheat flour for cake, with protein content at about 8%), 5 parts by weight of yeast, 12 parts by weight of sugar, 1.5 parts by weight of salt, 10 parts by weight of shortening, 10 parts by weight of egg, 2 parts by weight of skim milk powder, 1 part by weight of baking powder and 48 parts by weight of water, and doughnuts were produced by the process shown in Table 2.

TABLE 2

|  | Example 1 to 4 Comparative Examples 1 to 3 | Example 5 to 8 Comparative Examples 5 to 7 |
| --- | --- | --- |
| Mixing time | Low speed 2 min Medium high speed 8 min | Low speed 4 min Medium high speed 5 min Medium high speed 5 min* |
| Kneading temperature | 28° C. | 29° C. |
| Floor time | 20 min | 30 min |
| Weight of divided dough | 45 g | 45 g |
| Bench relaxing time | — | 15 min |
| Molding method | Ring drawing | Ring drawing |
| Hoilor temperature moisture time | 40° C. 60% 30 min | 35° C. 65% 30 min |

TABLE 2-continued

|  | Example 1 to 4 Comparative Examples 1 to 3 | Example 5 to 8 Comparative Examples 5 to 7 |
| --- | --- | --- |
| Oil frying temperature and time | 185° C. One side 60 sec | 185° C. One side 60 sec |

*After addition of the modifier and shortening, mixing was carried out for another 5 min at a medium high speed.

TABLE 3

|  | OIL (1) ABSORBED | (2) VOLUME | SOFTNESS (3) | | | | FEELING (4) | | | |
| --- | --- | --- | --- | --- | --- | --- | --- | --- | --- | --- |
|  |  |  | 6 HR | 24 HR | 48 HR | 72 HR | CRISP | SOFTNESS | TASTE | TOTAL |
| EXAMPLE |  |  |  |  |  |  |  |  |  |  |
| 1 | 9.2 | 238 | 35 | 32 | 28 | 22 | ◎ | ◎ | ◎ | ◎ |
| 2 | 9.0 | 230 | 35 | 31 | 26 | 23 | ○ | ◎ | ◎ | ◎ |
| 3 | 8.5 | 236 | 34 | 30 | 28 | 23 | ◎ | ◎ | ○ | ◎ |
| 4 | 7.6 | 220 | 34 | 31 | 25 | 21 | ◎ | ○ | ◎ | ◎ |
| 5 | 9.3 | 228 | 34 | 30 | 27 | 23 | ○ | ◎ | ◎ | ◎ |
| 6 | 8.9 | 220 | 33 | 31 | 24 | 20 | ◎ | ○ | ○ | ○ |
| 7 | 8.7 | 218 | 33 | 30 | 24 | 20 | ◎ | ○ | ◎ | ◎ |
| 8 | 8.6 | 222 | 35 | 31 | 27 | 23 | ◎ | ◎ | ◎ | ◎ |
| COMPARISON |  |  |  |  |  |  |  |  |  |  |
| 1 | 8.4 | 198 | 31 | 24 | 16 | 12 | X | X | △ | X |
| 2 | 9.1 | 205 | 32 | 25 | 21 | 16 | X | △ | X | △ |
| 3 | 8.0 | 200 | 30 | 24 | 17 | 14 | △ | X | X | X |
| 4 | 8.9 | 198 | 31 | 25 | 20 | 15 | ○ | △ | ○ | △ |
| 5 | 9.6 | 190 | 31 | 24 | 17 | 13 | △ | X | △ | △ |
| 6 | 8.8 | 185 | 30 | 23 | 18 | 14 | X | X | △ | X |
| 7 | 9.3 | 189 | 32 | 25 | 17 | 13 | X | X | △ | X |
| 8 | 9.1 | 189 | 31 | 23 | 19 | 14 | △ | X | ○ | △ |

Notes For Table 3
(1) The difference between the amounts of oil in the fryer before and after frying is regarded as the amount of oil absorbed by the doughnut. This column lists the average amount of oil (in grams) absorbed per doughnut.
(2) The doughnut is placed in a measure and the cavity formed is filled with rape seed. The volume of the rape seed is measured and the value of the volume of the measure minus the volume of the rapeseed oil is taken as the volume of the doughnut (in cm$^3$).
(3) The doughnut after frying was placed in a polyethylene bag and stored at room temperature (20° C.) before measurement. Measurements were made 6 hours, 24 hours, 48 hours, and 72 hours after production. Each doughnut was put flat on the measurement stand and a 500 gram load was applied from above through a circular flat plate of 8 cm diameter. The time (sec) was noted when the load no longer compressed the doughnut. Softer products are characterized by a longer time taken for the load to quit compressing the doughnut.
(4) An organoleptic test was conducted using a panel of 10 subjects. The subjects were asked if the crispness, softness, taste, and overall total organoleptic properties of doughnuts were good or not good. The symbols used in Table 3 reflect the following results:
The number of subjects who answered "good" was 9 or more: ◎
The number of subjects who answered "good" was between 6 and 8: ○
The number of subjects who answered "good" was between 3 and 5: △
The number of subjects who answered "good" was 2 or less: X Properties of the doughnuts are shown in Table 3.

COMPARATIVE EXAMPLE 8

A doughnut was produced by the same process as Examples 5 to 8 using 70 parts by weight of bread flour, 30 parts by weight of cake flour, 5 parts by weight of yeast, 12 parts by weight of sugar, 1.5 parts by weight of salt, 10 parts by weight of shortening, 10 parts by weight of egg, 2 parts by weight of skim milk powder, 1 part by weight of baking powder and 48 parts by weight of water. Properties of the doughnuts produced are also shown in Table 3.

As stated above, the present yeast-fermented food modifier is added to the dough for making yeast foods, such as doughnuts and pizza crust, thereby producing such effects that the food obtained from the dough has excellent softness just after its production, as compared with conventional dough products, and that the yeast-fermented food produced from the dough containing the present modifier is effectively prevented from aging and its softness can be maintained over a long period of time. Even when added in a large amount, the present modifier does not impair the taste of the food, in contrast to monoglyceride, and hence yeast-fermented foods having excellent tastes and flavors can be produced.

In addition, the final volume of yeast-fermented food is increased by the addition of the modifier of the present invention. Also, a fried yeast-fermented food such as a doughnut advantageously has low oil absorption so that it exhibits satisfactory softness and crispness. Furthermore, such food has no possibility of balling (dumpling) within the mouth. Therefore, yeast-fermented foods having excellent taste, flavor and crispness are produced by use of the modifier of the present invention.

Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of the invention.

We claim:

1. A modifier for yeast-fermented foods comprising:
   (a) 1 part by weight protein,
   (b) 0.5 to 4 parts by weight of a first material selected from the group consisting of edible fats, oils and mixtures thereof,
   (c) 3.5 to 13 parts by weight of water,
   (d) 0.5 to 2 parts by weight of a second material selected from the group consisting of mashed potato powder, sweet potato powder and starches, and
   (e) a third material selected from the group consisting of phosphates, cirtrates and mixtures thereof, said material being present in a range of 0.3 to 4.5% by weight based on the total weight of said protein, first material, water, and said second material.

2. The modifier for yeast-fermented foods according to claim 1, wherein said protein is selected from the group consisting of rennet casein, acid casein, whole milk powder, skim milk powder, soybean protein and mixtures thereof.

3. The modifier for yeast-fermented foods according to claim 1, wherein said starches are selected from the group consisting of corn starch, potato starch, sweet potato starch, rice starch, tapioca starch and mixture thereof.

4. The modifier for yeast-fermented foods according to claim 1, wherein said edible fats and oils are selected from the group consisting of animal fat and oil, vegetable fat and oil, hydrogenated oil, fractional oil, transesterified oil and mixtures thereof.

5. The modifier for yeast-fermented foods according to claim 1, wherein said phosphates are selected from the group consisting of disodium phosphate, trisodium phosphate, tetrasodium phosphate, sodium hexametaphosphate, sodium tripolyphosphate, monosodium diphosphate, disodium diphosphate, trisodium diphosphate, tetrasodium diphosphate, sodium pyrophosphate, dipotassium phosphate, tripotassium phosphate, tetrapotassium phosphate, aluminum sodium phosphate and mixtures thereof.

6. The modifier for yeast-fermented foods according to claim 1, where said citrates are selected from the group consisting of sodium citrate, potassium citrate and mixtures thereof.

7. A food product made with wheat flour and the modifier for yeast fermented foods of claim 1, the modifier being present at a ratio of 5-20% by weight of said wheat flour.

8. The food product of claim 7 comprising a doughnut.

* * * * *